United States Patent
Roszak

(10) Patent No.: US 6,601,796 B2
(45) Date of Patent: Aug. 5, 2003

(54) DEVICE FOR ATTACHMENT OF AN ENGINE ONTO AN AIRCRAFT NACELLE STUB

(75) Inventor: Sébastien Roszak, Toulouse (FR)

(73) Assignee: Airbus France (FR)

( * ) Notice: Subject to any disclaimer, the term of this patent is extended or adjusted under 35 U.S.C. 154(b) by 0 days.

(21) Appl. No.: 10/052,439

(22) Filed: Jan. 23, 2002

(65) Prior Publication Data
US 2002/0104924 A1 Aug. 8, 2002

(30) Foreign Application Priority Data
Feb. 8, 2001 (FR) .............................. 01 01701

(51) Int. Cl.⁷ .............................................. B64D 27/26
(52) U.S. Cl. .......................................... 244/54; 60/797
(58) Field of Search ................. 244/53 R, 54; 60/796, 797, 226.1

(56) References Cited

U.S. PATENT DOCUMENTS

| | | | |
|---|---|---|---|
| 5,275,357 A | | 1/1994 | Seelen et al. |
| 5,320,307 A | * | 6/1994 | Spofford et al. ............... 244/54 |
| 5,351,930 A | * | 10/1994 | Gwinn et al. ................... 244/54 |
| 5,620,154 A | | 4/1997 | Hey |
| 5,725,181 A | * | 3/1998 | Hey ............................... 244/54 |
| 6,059,227 A | * | 5/2000 | Le Blaye et al. .............. 244/54 |
| 6,173,919 B1 | * | 1/2001 | Le Blaye ....................... 244/54 |
| 6,341,746 B1 | * | 1/2002 | Pascal et al. .................. 244/54 |
| 6,347,765 B1 | * | 2/2002 | Jule et al. ...................... 244/54 |
| 6,401,448 B1 | * | 6/2002 | Manteiga et al. .............. 244/54 |
| 2001/0025902 A1 | * | 10/2001 | Jule et al. ...................... 244/54 |

* cited by examiner

Primary Examiner—Michael J. Carone
Assistant Examiner—Gabriel L Sukman
(74) Attorney, Agent, or Firm—Thelen Reid & Priest, LLP; Robert E. Krebs

(57) ABSTRACT

This device is designed to transmit lateral and vertical forces generated by the engine to the nacelle stub (10), together with the engine torque, and comprises a main attachment structure and an emergency attachment structure (38). The main attachment structure includes two half-fittings (18a, 18b), connecting rods (20a, 20c) connecting the two half-fittings to the engine and attachment devices for the half-fittings on the nacelle stub. The emergency attachment structure transmits forces between one of the two half-fittings and the nacelle stub when the other half-fitting or its devices for attachment to the nacelle stub are defective. For example, it comprises a hinge pin (42) supported by the nacelle stub and passing through a hole (44) formed in the half-fittings with a clearance.

4 Claims, 3 Drawing Sheets

DEVICE FOR ATTACHMENT OF AN ENGINE ONTO AN AIRCRAFT NACELLE STUB

TECHNICAL DOMAIN

This invention relates to a device for attachment of an aircraft engine onto a nacelle stub fixed to an element of the aircraft structure such as the wing or fuselage.

More precisely, the invention relates to an attachment device designed to transmit lateral and vertical forces from the engine (these force directions are applicable to the case in which the attachment device is fixed under the wing), and the engine torque, to the aircraft structure through the nacelle stub.

STATE OF THE ART

Engines installed on aircraft are suspended under the wings or are attached to the side of the fuselage by means of an element called an "engine nacelle stub". This element is called the "nacelle stub" throughout the rest of this text for simplification purposes.

The connection between the engine and the nacelle stub is usually made by two or three complementary attachment devices that perform separate functions.

The function of one of these attachment devices is to resist lateral and vertical forces generated by the engine, and the engine torque, in order to retransmit them to the aircraft structure through the nacelle stub. The invention relates particularly to this attachment device. Note particularly that a device of this type can be installed indifferently behind or in front of the engine, with the dimensions of the component parts being adapted accordingly.

As illustrated particularly in documents U.S. Pat. Nos. 5,620,154 and 5,275,357, some existing attachment devices comprise a main attachment structure and an emergency attachment structure. The main attachment structure transmits forces during normal operation, in other words when all parts of the attachment device are intact. The emergency attachment structure is provided to guarantee that the function to transmit forces between the engine and the aircraft is working at all times if one of the parts of the main attachment structure breaks. Thus, it makes it impossible for the engine to fall off.

In these existing attachment devices, the main attachment structure normally comprises a fitting fixed to the nacelle stub, for example by means of screws, and at least two swivel ended connecting rods making the connection between the fitting and the engine. The swivel mounted assembly of the connecting rods onto the fitting and onto the engine makes it impossible for the device to resist forces oriented along the longitudinal axis of the engine. This assembly also compensates for thermal expansion of the engine and maintains the simply supported nature of the connection between the nacelle stub and the engine.

As also illustrated in documents U.S. Pat. Nos. 5,620,154 and 5,275,357, when the existing attachment devices comprise emergency attachment structures, they usually include additional elements such as one or more additional connecting rods inserted between the fitting and the engine. These additional elements have clearances such that normally they do not resist any force when the parts of the main attachment structure are intact and consequently are capable of fulfilling their functions.

Some existing attachment devices such as those used in Airbus programs comprise an intermediate part inserted between the nacelle stub and the fitting. This intermediate part has a trapezoidal cross section and a first plane surface designed to be fixed, for example by four screws, onto an inclined attachment plane of the nacelle stub and a second horizontal plane surface to which the fitting is attached, for example by means of four other screws. The intermediate part may be a single piece or it may be composed of two half pieces assembled together by screws. Its presence contributes to making the attachment device complicated, heavy and large.

In existing attachment devices like those described in documents U.S. Pat. Nos. 5,620,154 and 5,275,357, the additional elements formed by the emergency attachment structure are always inserted between the fitting on the main attachment structure and the engine. In other words, these additional elements are used to conserve the integrity of the engine attachment when the connection between the fitting and the engine is involved. On the other hand, they are incapable of maintaining this integrity when the failure is at the link between the nacelle stub and the fitting, in other words for example the attachment screws or the intermediate part between the nacelle stub and the fitting, when there is an intermediate part.

One solution for maintaining the integrity of the connection between the nacelle stub and the fitting consists of oversizing the attachment screws inserted between the nacelle stub and the intermediate part, and between the said part and the fitting. The valid screws are sized to transmit the forces if one of the screws or one of the half parts forming the intermediate part should fail. However, this solution requires the use of special non-standard clamping tools that have to be kept on board the aircraft, which introduces an undesirable additional weight.

Furthermore, document FR-A-2 770 486 describes a device for attachment of an engine onto an aircraft nacelle stub, designed to maintain the integrity of the engine attachment even in the case of a failure of the fitting on the main attachment structure. This attachment device comprises a main attachment structure of a known type and an emergency attachment structure capable of connecting the nacelle stub to the engine directly without passing through the fitting if the fitting fails. The transmission of forces between the engine and the aircraft is then maintained. Furthermore, the solution described in this document eliminates the need for the presence of the intermediate part, thus making the attachment device absolutely safe.

PRESENTATION OF THE INVENTION

The purpose of the invention is a device for attachment of an engine on an aircraft nacelle stub, designed to protect the integrity of the engine attachment even following a failure of a half-fitting of the main attachment structure or the means of attachment of the half-fitting on the nacelle stub, while eliminating the need for the presence of the intermediate part.

According to the invention, this result is achieved by a device for attachment of an engine onto an aircraft nacelle stub, the device comprising a main attachment structure capable of transmitting forces between the engine and the nacelle stub during normal operation, and an emergency attachment structure that does not transmit any force during normal operation, the main attachment structure comprising a fitting consisting of two half-fittings, attachment means to fix each of the half-fittings to the nacelle stub separately, and at least two swivel ended connecting rods to connect the fitting to the engine, characterized in that the emergency attachment structure is arranged so that it will transmit the said forces to the other half-fitting if one of the half-fittings or the means of attaching the half-fittings to the nacelle stub should fail.

Since the emergency attachment structure connects the nacelle stub to the engine through the sound half-fitting, the connection between the nacelle stub and the engine is maintained entirely even if a half-fitting or the attachment means associated with the half-fitting should fail. Forces are continuously transmitted between the engine and the aircraft, and the engine cannot fall off, regardless of the cause of the failure (cracks, oxidation, material defects, etc.).

Furthermore, the integrity of the link between the fitting and the engine may be maintained by any of the means used in existing emergency attachment structures.

In one preferred embodiment of the invention, the emergency attachment structure comprises a hinge pin with an axis approximately parallel to the longitudinal axis of the engine, the said hinge pin being fixed to one of the parts composed of the fitting and the nacelle stub and passing through a hole formed in the other part with a clearance during normal operation.

Advantageously, the hinge pin is then fitted to a double hinge fitting that may itself be fitted to the nacelle stub, and the hole passes through the parts of the two half-fittings that fit into the said hinge fitting.

In this case, the double hinge fitting is preferably fixed to the nacelle stub by welding.

More precisely, each of the half-fittings can then be fixed by the said attachment means, onto a surface of the nacelle stub facing the engine, and the double hinge fitting projects towards the engine from the said surface.

BRIEF DESCRIPTION OF THE DRAWINGS

We will now describe a preferred embodiment of the invention as a non-restrictive example, with reference to the attached drawings in which.

DETAILED DESCRIPTION OF A PREFERRED EMBODIMENT OF THE INVENTION

Figure 1:
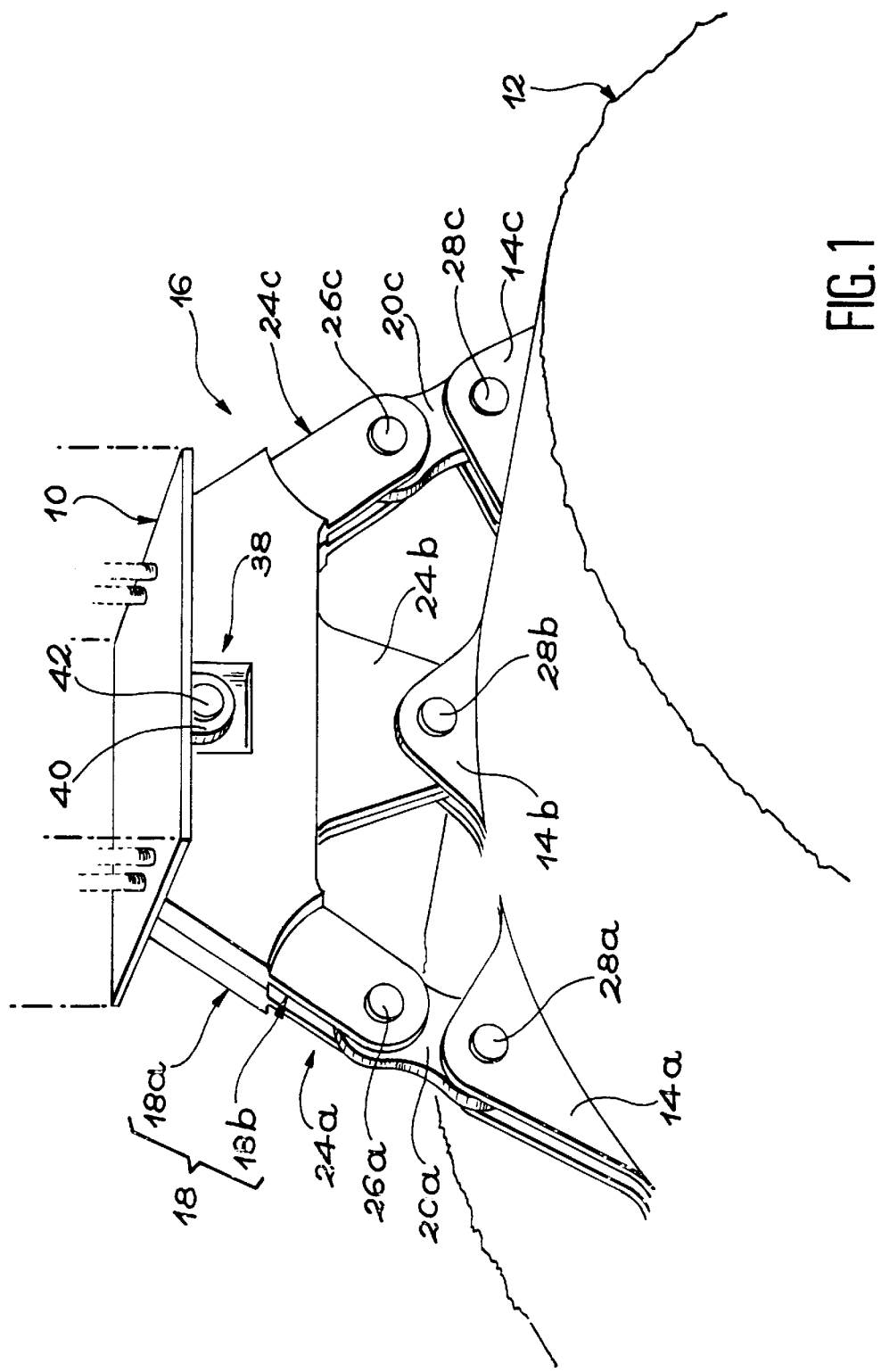
FIG. 1 is a perspective view that diagrammatically shows a preferred embodiment of an attachment device according to the invention.
Figure 2:
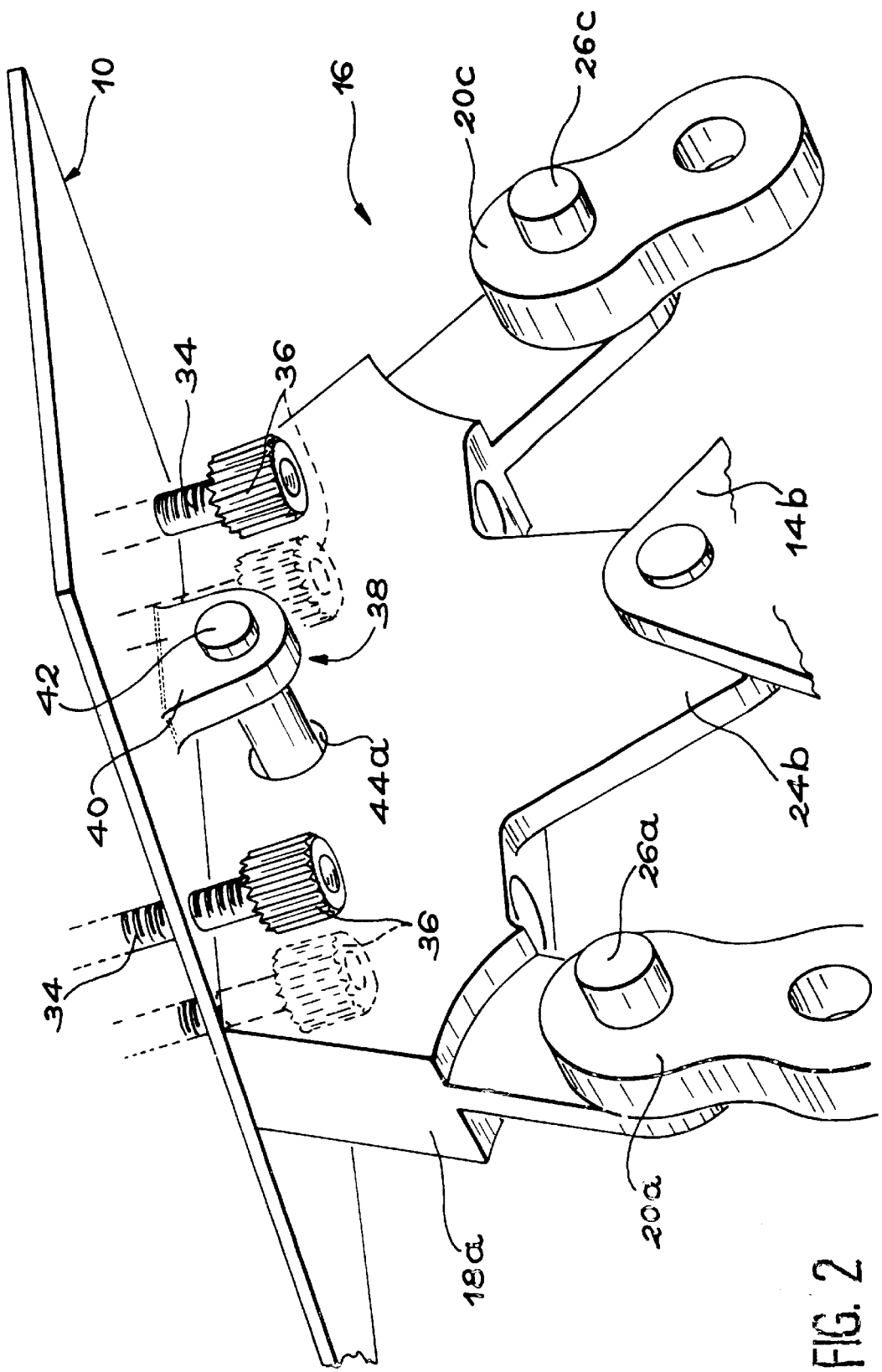
FIG. 2 is an enlarged perspective view of the attachment device in FIG. 1, on which one of the two half-fittings has been deliberately omitted to show the emergency attachment structure.

Reference 10 in FIGS. 1 and 2 denotes a nacelle stub designed to be fixed to a structural element of an aircraft such as the wing or the fuselage in a known manner. More precisely, reference 10 corresponds to a part of the nacelle stub designed to resist lateral and vertical forces generated by an engine, and the engine torque, so that they can be transferred to the aircraft structure through the nacelle stub 10.

Furthermore, reference 12 denotes part of the engine structure designed to be fixed to the nacelle stub 10. Parts such as double hinge fittings 14a, 14b and 14c form an integral part of the structure 12 or are designed to be fixed on it using techniques known to an expert in the subject, and which are outside the scope of the invention.

Several attachment devices are inserted between the nacelle stub 10 and the engine, to attach the engine to the aircraft structure. Only one of these attachment devices is shown in the figures. This device is generally denoted as reference 16. It connects the nacelle stub 10 to the engine hinge fittings 14a, 14b and 14c.

The attachment device 16 is made in accordance with the invention. Its function is to resist the lateral and vertical forces applied through the engine, and the engine torque, to retransmit them to the aircraft structure through the nacelle stub 10. Other forces are transmitted by other attachment devices (not shown) that can be made using different techniques known to an expert in the subject, and which are outside the scope of the invention.

As already observed, the attachment device 16, and consequently hinge fittings 14a, 14b and 14c may be located indifferently in front of or behind the engine.

The attachment device 16 according to the invention comprises a main attachment structure that transmits all the above mentioned forces when its various component parts are not damaged. The attachment device 16 also comprises an emergency attachment structure designed to replace the main attachment structure when any one of the elements normally making the connection between the nacelle stub 10 and the main attachment device fitting is defective.

In the preferred embodiment of the invention illustrated in the figures, the main attachment structure comprises a fitting 18, two simple lateral connecting rods 20a and 20c, and means of attaching the fitting 18 to the nacelle stub 10.

More precisely, the fitting 18 is formed of two half-fittings 18a and 18b assembled to each other in a known manner, for example by screws not shown in the figures. When the two half-fittings are assembled, they are in mutual contact through an interface 22 (FIGS. 3 and 4) materializing a plane of symmetry of the fitting 18.

The fitting 18 comprises two double hinge fittings 24a and 24c, the sides of which are formed in each of the two half-fittings 18a and 18b. These two double hinge fittings 24a and 24c are connected to connecting rods 20a and 20c by two swivel hinge pins 26a and 26c respectively. Two swivel hinge pins 28a and 28c also connect connecting rods 20a and 20c to the outermost double hinge fittings 14a and 14c supported by the engine structure 12.

The fitting 18 between the double hinge fittings 24a and 24c also includes a single hinge fitting 24b, half of which is formed in the half-fitting 18a and half of which is formed in the half-fitting 18b. A hinge pin 28b fixed onto the double hinge fitting 14b supported by the engine structure 12, passes through the single hinge fitting 24b with a clearance, between the double hinge fittings 14a and 14c. The connection with clearance thus made between the fitting 18 and the engine forms a first emergency assembly structure, designed to connect these two parts in the case of a failure of one of the connecting rods 20a and 20c or one of the swivel hinge pins that connect these connecting rods to the fitting 18 and to the hinge fittings 14a and 14c.

Note that the layout described above is only one possible embodiment of the connection between the fitting 18 and the engine structure 12. This layout may be replaced by any mechanically equivalent arrangement performing the same functions in different forms without going outside the scope of the invention.

On the side opposite the double hinge fittings 24a and 24c and the single hinge fitting 24b, the fitting 18 comprises a plane face 30 designed to come into contact with a plane face 32 on the nacelle stub 10. More precisely, half of the plane face 30 of the fitting 18 (reference 30a) is formed on the half-fitting 18a and half (reference 30b) is formed on the half-fitting 18b, on each side of their interface 22.

Figure 3:
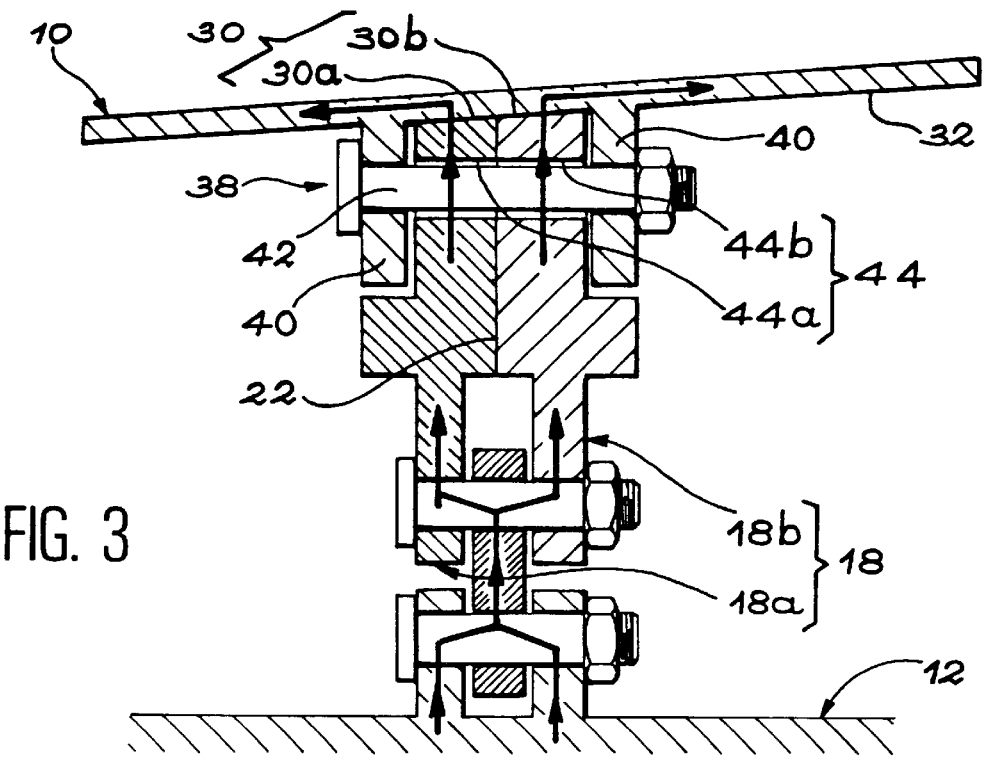
FIG. 3 is a diagrammatic sectional view of the attachment device in FIGS. 1 and 2, along the plane passing through the longitudinal axis of the engine illustrating the transmission of forces during normal operation.
Figure 4:
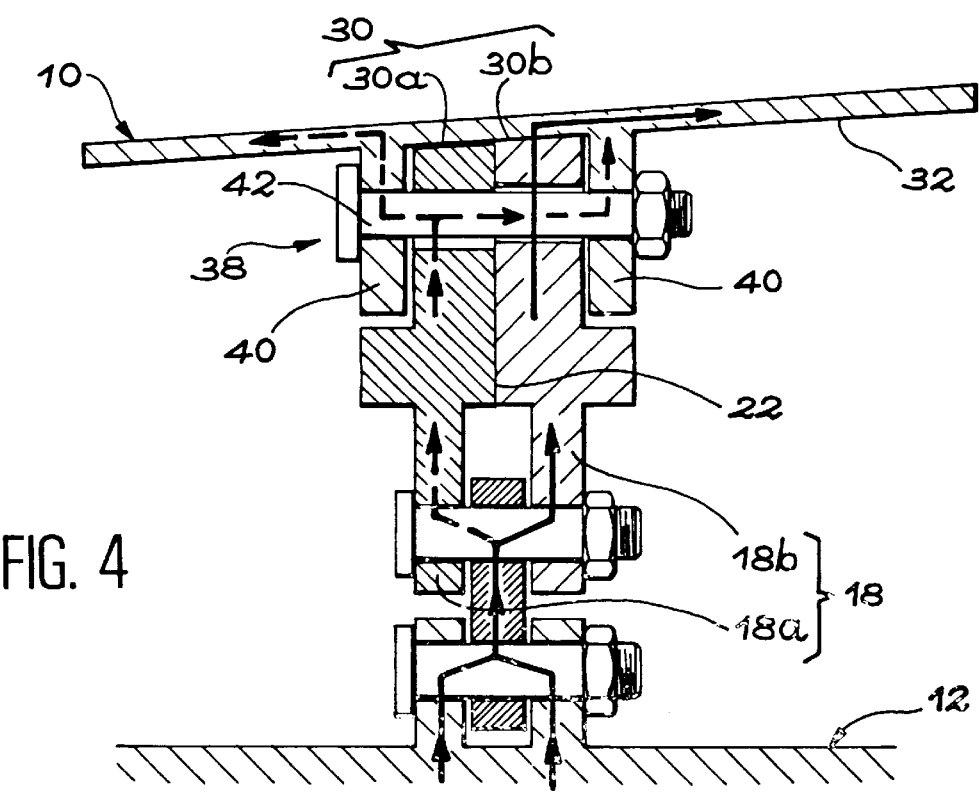
FIG. 4 is a sectional view similar to FIG. 3, illustrating the transmission of forces in the case of a failure in the left half-fitting or in its means of attachment to the nacelle stub.

When the engine is attached under the aircraft wing, the plane face 32 of the nacelle stub 10 is facing downwards and forwards, as shown particularly in FIGS. 3 and 4. The interface between the fitting 18 and the nacelle stub 10 needs to be adapted in order to take account of this inclination and to orient the interface 22 in the vertical direction without the addition of any intermediate part. This can be done by forming bushings (not shown) either on face 30 and 32, or on fitting 18 and nacelle stub 10.

The two half-fittings 18a and 18b are fixed to the nacelle stub 10 by appropriate attachment means illustrated in FIG. 2. For example, these attachment means may include two screws 34 and two nuts 36 for each of the half-fittings.

More precisely, the nuts 36 are embedded into each of the two half-fittings 18a and 18b and prevented from rotation in them, such that their axes are oriented parallel to the interface 22 and perpendicular to the interface between the fitting 18 and the nacelle stub 10. The screws 34 pass through holes machined in the nacelle stub and in the half-fittings, along the axes of the nuts 36. Their heads are in pressurized contact with support surfaces provided on the nacelle stub, opposite the plane face 32. Thus, the effect of tightening screws 34 in the nuts 36 is to bring the plane faces 30a and 30b of the half-fittings 18a and 18b into contact with the plane face 32 of the nacelle stub 10.

According to the invention, this arrangement is complemented by a second emergency attachment structure 38, inserted between the nacelle stub 10 and the fitting 18.

In the preferred embodiment of the invention shown in the figures, the emergency attachment structure 38 comprises a double hinge fitting 40. The two sides of the double hinge fitting 40 project on the plane face 32 of the nacelle stub 10 on each side of the fitting 18 or in corresponding recesses provided in each of the half-fittings 18a and 18b. The double hinge fitting 40 is fixed to the nacelle stub 10 by any appropriate means, for example such as welding.

The emergency attachment structure 38 also comprises a hinge pin 42 that is fixed to the sides of the double hinge fitting 40, at a given distance from the plane face 32. In particular, the hinge pin 42 can be attached to the double hinge fitting 40 by providing it with a shoulder at one end and a thread on which a nut is screwed at its opposite end (FIGS. 3 and 4). However, any other attachment or immobilization method for the hinge fitting 40 can be used without going outside the scope of the invention. Furthermore, the centre line of the hinge pin 42 is oriented along a direction approximately parallel to the longitudinal axis of the engine.

The hinge pin 42 passes through a hole 44 with a circular cross-section machined in the fitting 18. The hole 44 is broken down into two parts 44a and 44b formed in each of the two half-fittings 18a and 18b on each side of the interface 22.

The cross-section of the hole 44 is significantly larger than the cross-section of the hinge pin 42, such that there is sufficient clearance between the two and so that the hinge pin 42 is not in contact with the half-fittings 18a and 18b in normal operation, in other words when all parts of the main attachment structure are intact. Furthermore, there is also sufficient axial clearance between the sides of the double hinge fitting 40 and the fitting 18, such that the hinge fitting is not in contact with the half-fittings 18a and 18b during normal operation. These clearances take account of expansion and engine movements with respect to the various attachment devices.

In the arrangement that has just been described, the various parts forming the emergency attachment structure 38 do not transmit any force during normal operation, in other words when the various parts forming the main attachment structure are not damaged. As illustrated by the arrows in FIG. 3, the lateral and vertical forces and the engine torque are then transmitted from the engine to the nacelle stub 10, passing through the swivel hinge pins 28a, 28c, the connecting rods 20a, 20c, the swivel hinge pins 26a, 26c, half-fittings 18a, 18b and the screw 34 and nut 36 assemblies (not shown in FIGS. 3 and 4).

As shown in FIG. 4, if one of the half-fittings breaks (half-fitting 18a on FIG. 4) or if at least one of the screws 34 used to fix this half-fitting onto nacelle stub 10 should break, the forces from the engine are transmitted to the nacelle stub partly through the other half-fitting (half-fitting 18b in FIG. 4) and through screws 34 that connect it to the nacelle stub 10 (solid arrows shown in FIG. 4) and partly through the defective half-fitting, the hinge pin 42 and the double hinge fitting 40, after the clearance initially separating these two parts has been eliminated (arrows shown in dashed lines in FIG. 4).

Thus, the objective consisting of maintaining the integrity of the engine attachment, even following a failure of one of the half-fittings 18a, 18b or means of attachment of these fittings onto the nacelle stub, is achieved without the use of the intermediate part usually placed between the nacelle stub and the fitting.

Obviously, the invention is not restricted to the embodiment described above. Thus, attachment means by which each of the half-fittings is installed on the nacelle stub may be different from the screw/nut assemblies described. The same is true for the emergency attachment structure which may be laid out differently, for example the hinge pin may be connected to the fitting and pass through a hole machined in the nacelle stub with a clearance.

What is claimed is:

1. Device for attachment of an engine onto an aircraft nacelle stub, the device comprising a main attachment structure capable of transmitting forces between the engine and the nacelle stub during normal operation, and an emergency attachment structure that does not transmit any force during normal operation, the main attachment structure comprising a fitting including two half-fittings, attachment means that fix each of the two half-fittings to the nacelle stub separately, and at least two swivel ended connecting rods that can connect the fitting to the engine, in which the emergency attachment structure is laid out such that it would transmit the said forces through the other half-fitting if one of the half-fittings fails or if the means of fastening the half-fitting onto the nacelle stub fails, and the emergency attachment structure comprises a hinge pin with an axis approximately parallel to a longitudinal axis of the engine, the said hinge pin being fixed to one of the parts composed of the fitting and the nacelle stub and passing through a hole formed in the other part with a clearance, during normal operation.

2. Device according to claim 1, in which the hinge pin is fixed to a double hinge fitting that can be fixed to the nacelle stub, and the hole passes through the parts of the two half-fittings that fit into the said hinge fitting.

3. Device according to claim 2, in which the double hinge fitting is welded to the nacelle stub.

4. Device according to claim 2, in which each of the half-fittings can be fixed by the said attachment means onto a surface of the nacelle stub facing the engine and the double hinge fitting projects from the said surface towards the engine.

* * * * *